United States Patent
Guo et al.

(10) Patent No.: US 8,384,038 B2
(45) Date of Patent: Feb. 26, 2013

(54) READOUT ELECTRONICS FOR PHOTON COUNTING AND ENERGY DISCRIMINATING DETECTORS

(75) Inventors: Jianjun Guo, Ballston Spa, NY (US); Naresh Kesavan Rao, Clifton Park, NY (US); John Eric Tkaczyk, Delanson, NY (US); Yanfeng Du, Rexford, NY (US); Naveen Chandra, Kenosha, WI (US)

(73) Assignee: General Electric Company, Niskayuna, NY (US)

( * ) Notice: Subject to any disclaimer, the term of this patent is extended or adjusted under 35 U.S.C. 154(b) by 379 days.

(21) Appl. No.: 12/490,903

(22) Filed: Jun. 24, 2009

(65) Prior Publication Data

US 2010/0329425 A1 Dec. 30, 2010

(51) Int. Cl.
*G01T 1/24* (2006.01)
(52) U.S. Cl. ................................. 250/370.09
(58) Field of Classification Search .............. 250/370.09
See application file for complete search history.

(56) References Cited

U.S. PATENT DOCUMENTS

| 4,491,799 | A * | 1/1985 | Giardinelli ........................ 330/2 |
| 6,657,200 | B2 | 12/2003 | Nygard et al. |
| 7,388,534 | B2 * | 6/2008 | Astley et al. .................. 341/155 |
| 7,829,860 | B2 * | 11/2010 | Nygard et al. ........... 250/370.09 |
| 2008/0149842 | A1 * | 6/2008 | El-Hanany et al. ...... 250/370.09 |
| 2009/0296079 | A1 * | 12/2009 | Cooley ......................... 356/221 |

FOREIGN PATENT DOCUMENTS

| EP | 01016882 A2 | 7/2000 |
| EP | 01016882 A3 | 3/2002 |

OTHER PUBLICATIONS

Geronimo et al., "ASIC With Multiple Energy Discrimination for High-Rate Photon Counting Applications," IEEE Transactions on Nuclear Science, vol. 54, No. 2, Apr. 2007, pp. 303-312.
Iwanczyk et al., "Photon Counting Energy Dispersive Detector Arrays for X-ray Imaging," 2007 IEEE Nuclear Science Symposium Conference Record, pp. 2741-2748.

* cited by examiner

*Primary Examiner* — David Porta
*Assistant Examiner* — Hugh H Maupin
(74) *Attorney, Agent, or Firm* — John P. Darling (57) ABSTRACT

A data acquisition system includes a charge-sensitive amplifier (CSA) configured to receive a charge from an x-ray detector, the CSA includes a high-gain electronic voltage amplifier, an electrical energy storage device coupled with the amplifier, and an electrical resistor coupled with the amplifier. The data acquisition system includes a baseline sampling circuit configured to receive an output from the CSA and to sample a baseline signal from the CSA, at least one discriminator coupled to an output of the CSA and to an output of the baseline sampling circuit, the at least one discriminator configured to output a voltage if the output of the CSA exceeds a threshold, and a counter coupled to an output of the discriminator and configured to output a digital signal indicative of a photon count received at the x-ray detector and based on the output from the CSA and on the signal from the CSA.

24 Claims, 6 Drawing Sheets

READOUT ELECTRONICS FOR PHOTON COUNTING AND ENERGY DISCRIMINATING DETECTORS

BACKGROUND OF THE INVENTION

Embodiments of the invention relate generally to radiation detectors and, more particularly, to an apparatus and method for acquiring and processing electronic data from a radiation detector.

In the fields of security screening and medical imaging, non-invasive imaging techniques employing radiation detectors have gained importance due to benefits that include unobtrusiveness, ease, and speed. A number of non-invasive imaging techniques exist today. Single-photon-emission computed tomography (SPECT) imaging and x-ray computed tomography (CT) imaging are two examples.

At least two factors explain the increased importance of radiation detectors in security screening: an increase in terrorist activity in recent years, and an increase in the number of travelers. The detection of contraband, such as explosives and radioactive materials, being transported in luggage, cargo containers, and small vehicles and taken onto various means of transportation has become increasingly important. To meet the increased need for such detection, advanced systems have been developed that can not only detect suspicious articles being carried in luggage and other containers but can also determine whether or not the articles contain explosives or radioactive materials.

There is also a need for high-resolution gamma radiation detectors which can detect radioactive materials from a variety of sources. To gain widespread use, these radiation detectors must be economical, easily portable, and have low-power consumption. Semiconductor materials, such as cadmium-telluride (CdTe) and cadmium-zinc-telluride (CZT) crystals have applicability for compact radiation detectors. CdTe and CZT detectors have been shown to exhibit good energy resolution, especially as compared to scintillator-based detectors. Since they are direct conversion devices (i.e., convert radioactive particles, such as photons, directly into electronic signals), CdTe and CZT detectors eliminate the need for bulky photomultiplier tubes or the need for a scintillator as in a CT application. Furthermore, CdTe and CZT radiation detectors do not require cryogenic cooling, as do high-purity germanium radiation detectors.

SPECT and CT imaging systems can incorporate such semiconductor, or solid state, radiation detector technology. CT systems are capable of acquiring mass and density information (as well as materials-specific information, such as an effective atomic number) on items within a piece of luggage. Although object density is an important quantity, surrogates such as "CT number" or "CT value", which represent a linear transformation of the density data, may be used as the quantity indicative of a threat. Features such as mass, density, and effective atomic number embody derived quantities such as statistical moments, texture, etc. of such quantities.

In CT imaging systems, an x-ray source emits a fan-shaped beam towards a subject or an object, such as, for example, a patient or piece of luggage. Hereinafter, the terms "subject" and "object" shall include anything capable of being imaged. The beam, after being attenuated by the object, impinges upon an array of radiation detectors. The intensity of the attenuated beam radiation received at the detector array is typically dependent upon the attenuation of the x-ray beam by the object. Each detector element of the detector array produces a separate electrical signal indicative of the strength of the attenuated beam received by each detector element. The electrical signals are transmitted from the detector array to a data processing system for analysis which ultimately produces an image.

Typically, in SPECT imaging systems, a gamma camera or similar radiation detector locates radiation emitted from a subject such as a patient, or an object such as a piece of luggage containing a radioactive substance. As above, "subject" and "object" are used interchangeably. When imaging a patient, a gamma-ray-emitting tracer material is administered to the patient. Typically, the tracer material is absorbed by the organ of interest to a greater degree than by other organs. In these systems, each element of the detector array produces a signal in relation to the localized intensity of the radiation emitted from the object. As with conventional x-ray imaging, the strength of the emission signal is attenuated by the interlying object or body part. Each element of the detector array produces a separate electrical signal indicative of the photon impinging upon the detector element. The electrical signals are transmitted from the detector assembly to a data processing system for analysis, which ultimately produces an image.

In SPECT imaging, a plurality of images is acquired at various angles around the area of interest. To acquire the images, the gamma camera is rotated around the object. Generally, in transaxial tomography, a series of 2-D images, or views, are taken at equal angular increments around the object. Typically, projections are acquired every 3-6 degrees. In some cases, a full 360 degree rotation is used to obtain an optimal reconstruction. Multi-head gamma cameras can provide accelerated image acquisition. For example, a dual-head camera can be used with detectors spaced 180 degrees apart, allowing two projections to be acquired simultaneously, with each head requiring 180 degrees of rotation. Triple-head cameras with 120 degree spacing are also used.

The series of views around the object are reconstructed to form transaxial slices, or slices across the axis of rotation. The reconstruction is performed by a computer, which applies a tomographic reconstruction algorithm to the multiple views, yielding a 3-D dataset. This dataset may then be manipulated to show thin slices along any chosen axis of the body, similar to those obtained from other tomographic techniques, such as CT and PET.

A gamma camera radiation detector assembly may employ a multi-channel collimator and gamma ray detector to convert energy from the gamma ray photon into an electrical signal, which can be interpreted to locate the position of the gamma ray interaction in a planar detector. Gamma cameras may also include a large scintillation crystal responsive to radiation stimuli, such as gamma rays, emitted by a patient, and an array of photomultiplier tubes optically coupled to the crystal. In operation, the gamma rays emitted by the patient in the direction of the detector are collimated onto the crystal. Each gamma ray photon cloud that interacts with the crystal produces multiple light events that are detected by the photomultipliers near the point of interaction. Each light event detected by the photomultipliers produces an electrical signal. The electrical signals from the photomultiplier array are combined to provide an estimate of the location of the gamma ray emission. Analog and digital processing of the signal results in the generation of an image from the acquired data.

However, gamma cameras may also employ semiconductor detector elements, such as cadmium-zinc-telluride (CZT) elements, to replace the scintillator/photomultiplier system. CZT detector elements convert the signal from gamma ray photons directly into an electronic signal. By eliminating the light conversion step needed in scintillator/photomultiplier cameras, a gamma camera using semiconductor radiation detectors may exhibit higher signal to noise ratio, and increased sensitivity which can result in greater energy level resolution and better imaging contrast resolution.

SPECT and CT imaging systems incorporating semiconductor detector array technology may be able to provide compositional analysis of tissue using spectroscopic x-ray imaging while improving overall image quality and reducing the x-ray dose to the object. Recent advances in the development cadmium-zinc-telluride (CZT) detectors and other direct conversion (i.e. semiconductor) detectors have extended the application of such detectors to medical imaging (i.e., SPECT and CT systems), security screening, nuclear experimentation, as well as to oil exploration and mining. As these detectors find more uses, increasing demands are placed on the electronic components of the detectors. The front end readout electronics or data acquisition system for a CZT detector is generally expected to exhibit low-noise, high linearity, wide dynamic range, and good drive capability. In addition to these requirements, portable systems may also demand data acquisition systems that are low-power, low-cost, with a high channel count.

Primarily, front end readout electronics capture two pieces of information from the radiation detector: the energy level of the radiation and the timing of the detection. While the energy level indicates the energy spectrum of the radiation, timing information is used to determine the depth of interaction so as to provide the full 3D position sensitivity needed for image reconstruction. There have been several application-specific integrated circuits (ASICs) developed to function as the front end readout electronics for radiation detectors. However, in order to achieve a high count rate of these new applications, these ASICs typically have high power consumption, and are typically subject to baseline wander caused by a variable count rate. Baseline wander is exacerbated by an increased leakage current due to the higher count rate, thus causing stability issues for high speed data acquisition. These ASICs also tend to be large in physical size, which can limit applications in which they are desired to be used.

It would be desirable to have a data acquisition system for radiation detectors that can operate at low power, with little noise, offer complete energy level and time discrimination capabilities, provide digital outputs, reduce package size, and reduce baseline wander caused by a variable count rate application.

BRIEF DESCRIPTION OF THE INVENTION

According to one aspect of the invention, a data acquisition system includes a charge-sensitive amplifier (CSA) configured to receive a charge from an x-ray detector, the CSA includes a high-gain electronic voltage amplifier, an electrical energy storage device coupled in parallel with the high-gain electronic voltage amplifier, and an electrical resistor coupled in parallel with the high-gain electronic voltage amplifier. The data acquisition system includes a baseline sampling circuit configured to receive an output from the CSA and configured to sample a baseline signal from the CSA, at least one discriminator coupled to an output of the CSA and to an output of the baseline sampling circuit, the at least one discriminator configured to output a voltage if the output of the CSA exceeds a threshold voltage, and a counter coupled to an output of the discriminator and configured to output a digital signal indicative of a photon count received at the x-ray detector and based on the output from the CSA and based on the baseline signal from the CSA.

In accordance with another aspect of the invention, a method of acquiring x-ray imaging data includes sampling a baseline signal in an imaging detection circuit prior to receiving an output from an x-ray detector, receiving the output from the x-ray detector in a high-gain amplifier, the output indicative of a charge received in an x-ray detector, and amplifying the output in the high-gain amplifier to generate an amplified output. The method further includes generating a shaped pulse of the amplified output, and generating a digital signal based on the shaped pulse and the baseline signal.

Yet another aspect of the invention includes a radiation detection system that includes a semiconductor radiation detector configured to output an electrical signal when a first pulse of radiation is detected, an application-specific integrated circuits (ASIC) configured to receive and amplify the output from the radiation detector, a baseline sampling circuit configured to sample a baseline electrical signal from the ASIC prior to detecting the first pulse of radiation, and a digital output device configured to output a digital signal that is a function of at least the electrical signal and the sampled baseline.

These and other advantages and features will be more readily understood from the following detailed description of preferred embodiments of the invention that is provided in connection with the accompanying drawings.

DETAILED DESCRIPTION OF EXEMPLARY EMBODIMENTS

Diagnostics devices typically comprise x-ray systems, magnetic resonance (MR) systems, ultrasound systems, computed tomography (CT) systems, positron emission tomography (PET) systems, single-photon-emission computed tomography systems (SPECT), and other types of imaging systems. Applications of x-ray sources comprise imaging, medical, security, industrial inspection applications, and portable radiation detectors. The operating environment described herein includes a 64-slice CT system. However, it will be appreciated by those skilled in the art that an implementation of the embodiments described herein is also applicable for use with single-slice or other multi-slice configurations. More generally, an implementation is employable for detection and conversion of x-rays. However, one skilled in the art will further appreciate that an implementation is employable for the detection and conversion of other high frequency electromagnetic energy, high frequency polychromatic electromagnetic energy, and/or radiographic energy. An implementation is employable with a "third generation" CT scanner and/or other CT systems.

Figure 1:
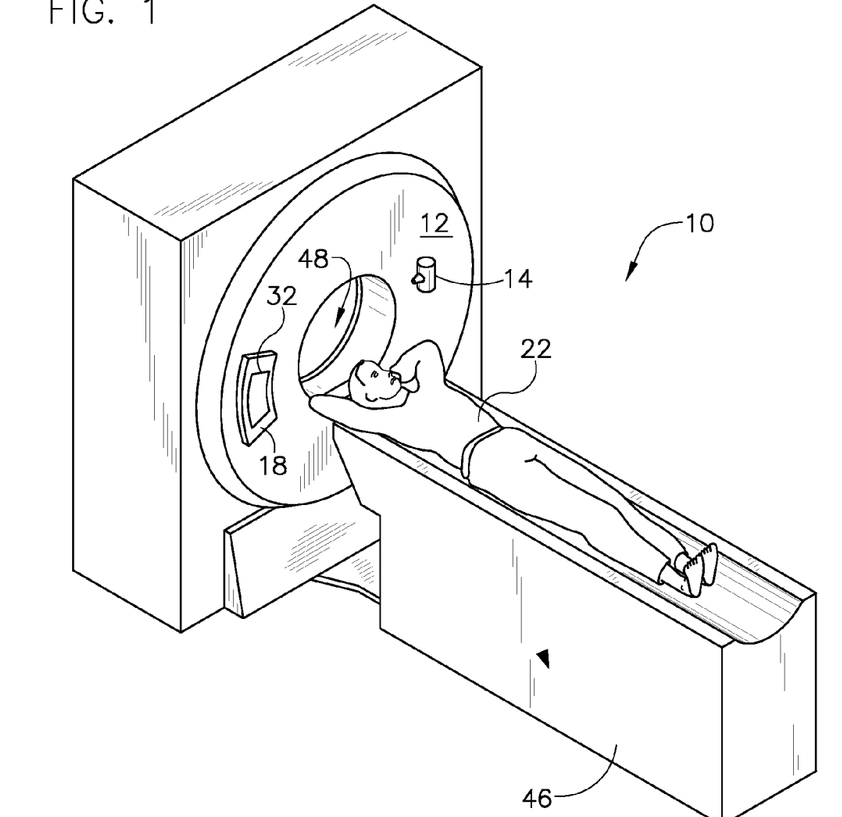
FIG. 1 is a pictorial view of an implementation of a CT imaging system.
Figure 2:
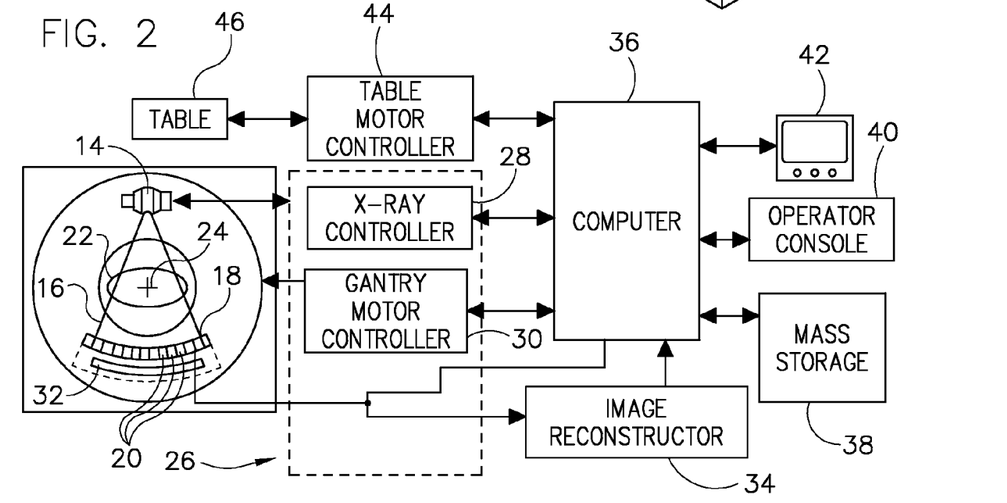
FIG. 2 is a block diagram of the system illustrated in FIG. 1.

Referring to FIGS. 1 and 2, a diagnostic and/or computed tomography (CT) imaging system 10 is shown as including a gantry 12 representative of a "third generation" CT scanner. The CT imaging system 10 in an example comprises an energy discriminating (ED) and/or multi energy (ME) CT imaging system that may be referred to as an EDCT and/or MECT imaging system. Gantry 12 has an x-ray source 14 that projects a beam of x-rays 16 toward a detector array 18 on the opposite side of the gantry 12. Detector array 18 is formed by a plurality of detectors such as ED detectors 20 which together sense the projected x-rays that pass through a patient or object 22. Each ED detector 20 produces an electrical signal that represents the intensity of an impinging x-ray beam and hence the attenuated beam as it passes through the object 22. The ED detector 20 obtains ED readout from the beam of x-rays 16. During a scan to acquire x-ray projection data, gantry 12 and the components mounted thereon rotate about a center of rotation 24, as will be appreciated by those skilled in the art.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. A data acquisition system (DAS) 32 in control mechanism 26 samples analog data from the ED detectors 20 and converts the data to digital signals for subsequent processing. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position object 22 and gantry 12. Particularly, table 46 moves portions of object 22 through a gantry opening 48.

EDCT/MECT provides energy discrimination and material characterization. For example, in the absence of object scatter, the system derives the behavior at any other energy based on the signal from two regions of photon energy in the spectrum: the low-energy and the high-energy portions of the incident x-ray spectrum. In an energy region of CT, two physical processes dominate the x-ray attenuation: (1) Compton scatter and the (2) photoelectric effect. The detected signals from two energy regions provide sufficient information to resolve the energy dependence of the material being imaged. Furthermore, detected signals from the two energy regions provide sufficient information to determine the relative composition of an object 22 composed of two materials.

In one embodiment, photon counting with enhanced energy separation, and/or extended dynamic range is provided. A configurable implementation of the ED detector 20 comprises photon counting at low flux and/or count rate and switchability to an integration mode at high flux and/or count rate. One implementation comprises a material with extended range and coupled to a DAS 32 that can read out both photon counting and integration information. An exemplary implementation of the ED detector 20 comprises photon counting and energy integration capability such as for x-ray and CT systems for imaging in medical, industrial, and/or security systems.

Figure 3:
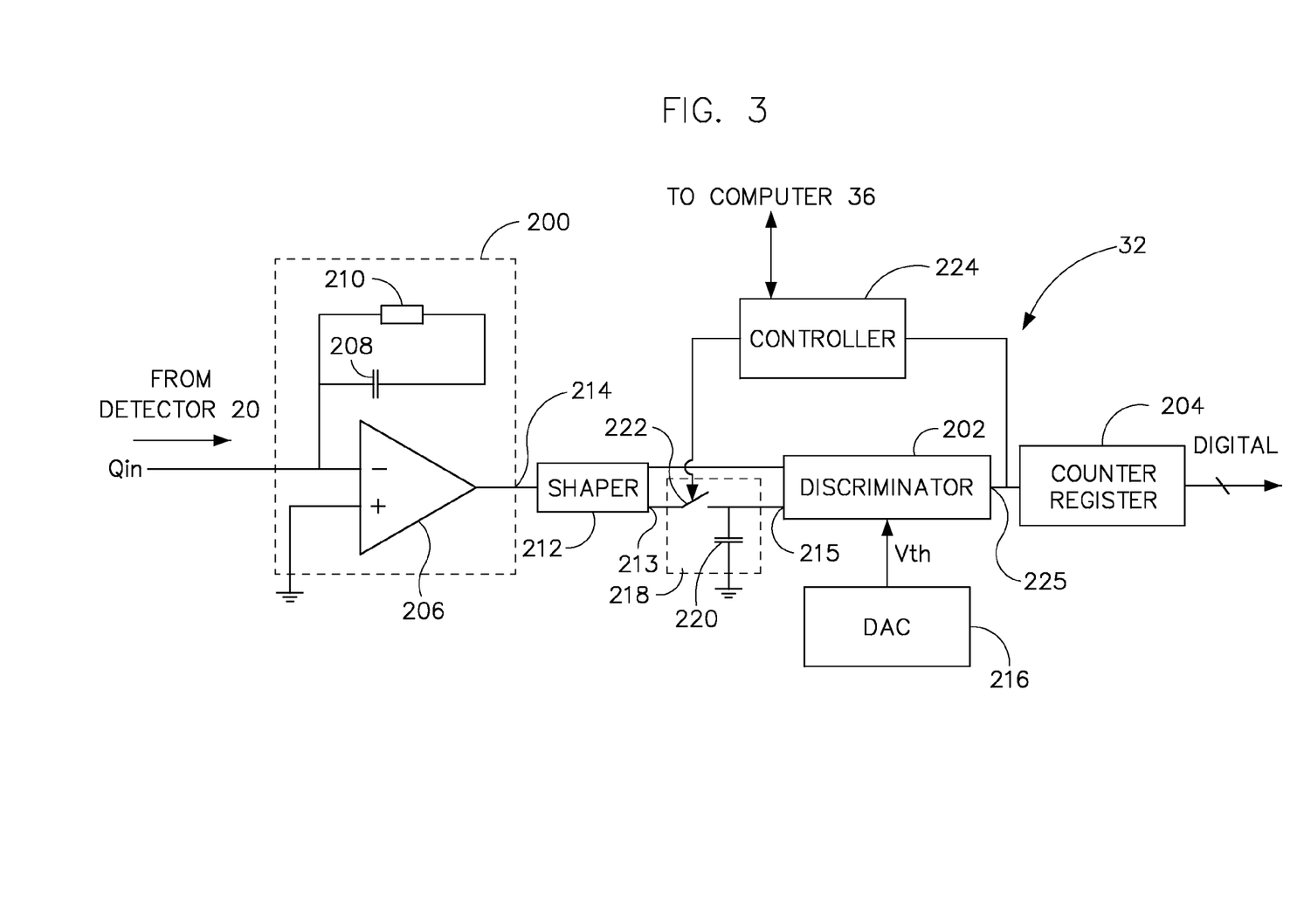
FIG. 3 is a block diagram of a channel of the DAS of FIGS. 1 and 2 having a pulse reset circuit, according to an embodiment of the invention.

FIG. 3 shows a channel of DAS 32 according to an embodiment of the invention. In this embodiment, a schematic diagram of charge-sensitive amplifier (CSA) 200 is shown coupled to a discriminator 202 and a counter register 204. CSA 200 integrates a charge $Q_{in}$ collected by the detector 20 (shown in FIG. 2) and converts it to an output or voltage. Typically, the signal $Q_{in}$ from a semiconductor radiation detector 20, such as a CZT detector, is a quantity of charge delivered as a current pulse lasting from one nanosecond to ten microseconds, depending on the size and bias voltage of the detector. The quantity of charge is a function of the energy collected by detector 20.

FIG. 3 illustrates one embodiment of a channel of DAS 32 that includes CSA 200 having a high-gain voltage amplifier 206, which in the embodiment illustrated is an operational amplifier (opamp). CSA 200 also includes a feedback capacitor 208, which is connected in parallel with high-gain voltage amplifier 206 and integrates charge $Q_{in}$. Another function of CSA 200 is to compensate for leakage current in detector 20 and to prevent high-gain voltage amplifier 206 from saturating. Thus, CSA 200 includes a reset element 210, such as a resistive element, connected in parallel with high-gain voltage amplifier 206. Reset or resistive element 210, in one embodiment, may be a discrete resistor, and in another embodiment may be implemented using one or more transistors, such as a Field Effect Transistor (FET), where the resistance may be controlled by an applied voltage. The reset element 210 provides for resetting charge built up across the capacitor 208 as the high-gain voltage amplifier 206 responds to the charge pulses from detector 20.

CSA 200 outputs an analog signal or voltage pulse for discriminator 202. Typically, the voltage pulses are further processed by pulse shaping. In one embodiment, a pulse shaper 212 is coupled to an output 214 of CSA 200 and configured to shape the charge pulse from CSA 200 in order to improve the signal-to-noise ratio, optimize jitter, and the like. Typically, energy resolution may be affected by a shaping time of pulse shaper 212. The longer the shaping time of pulse shaper 212, the better the higher frequency noise can be rejected, resulting in lower noise in a shaped voltage pulse. However, if the shaping time is made too long, this may result in excessive circuit dead time that can lead to overlap of shaped pulses and a distortion in the amplitude of the shaped pulse. Thus, the characteristics of pulse shaper 212 are selected in order to balance these effects.

The pulse shaper 212 is coupled to discriminator 202 and configured to output a shaped analog signal thereto. A digital-analog converter (DAC) 216 is coupled to discriminator 202 and configured to establish or convert a digital threshold to a threshold voltage, $V_{th}$, to be used by discriminator 202. The discriminator 202 increments counter register 204 when a signal from CSA 200 exceeds $V_{th}$, and counter register 204 outputs a digital signal therefrom. At the high and variable count rates experienced in, for instance, a CT application, the baseline for measuring energy content may wander as a function of count rate. Leakage current in the detector exacerbates the amount of baseline wander. Baseline wander may negatively affect output of DAS 32 because, as the baseline wanders, the resulting signal may not consistently determine whether the signal from CSA 200 exceeds $V_{th}$. Thus, for a given charge $Q_{in}$ collected by detector 20, it is possible that for a first baseline, $V_{th}$ may be exceeded, but for a second baseline $V_{th}$ may not be exceeded. Accordingly, there is a need to reduce the effect of baseline wander so that signals from charge $Q_{in}$ collected by detector 20 may be consistently assessed against the baseline to determine whether $V_{th}$ has been exceeded.

Thus, according to embodiments of the invention, DAS 32 includes a baseline sampling circuit 218 coupled to an output 213 of shaper 212 and to an input 215 of discriminator 202. Baseline sampling circuit 218 includes an energy storage device 220, which may include a capacitor, and a low-impedance switch 222, which may be a passive device such as a discrete resistor or an active device such as a FET, as examples. Baseline sampling circuit 218 also includes a controller 224 coupled to an output 225 of discriminator 202 and coupled to switch 222.

During operation, after the arrival of a signal from detector 20 but before the arrival of a subsequent signal from detector 20, controller 224 momentarily closes switch 222 such that discriminator 202 may capture the baseline voltage of DAS 32. Controller 224 then opens switch 222 such that when the subsequent signal or charge (otherwise defined as an event) next arrives to CSA 200 from detector 20, the charge is processed through CSA 200, shaped in pulse shaper 212, and passed to discriminator 202. Thus, as the baseline shifts during operation due to a variable or changing rate of photon incidence upon detector 20 and a corresponding change of leakage current, baseline sampling circuit 218 is able to minimize such effects and yield a more accurate measure of each event that results in a charge being generated.

Figure 4:
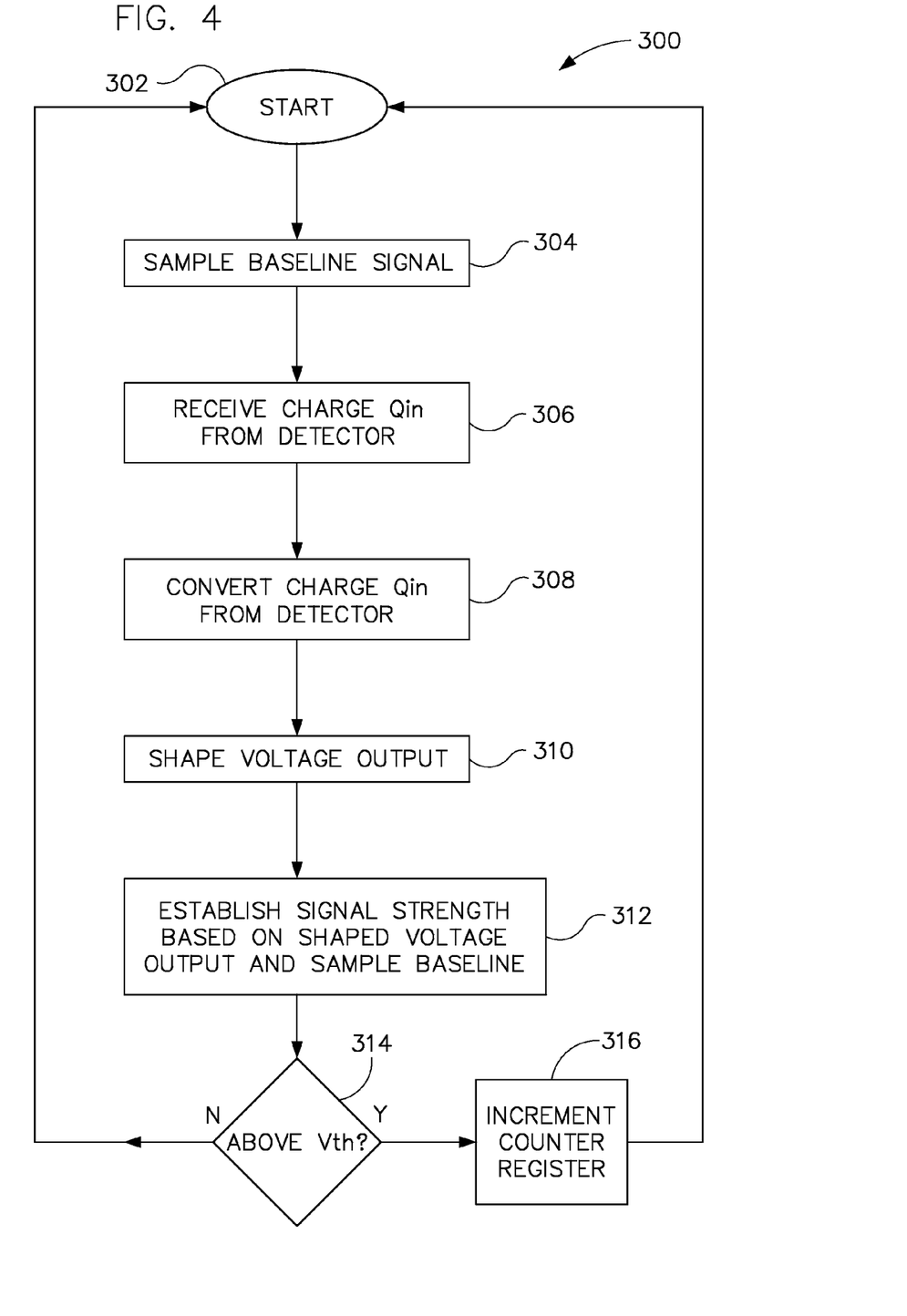
FIG. 4 is a method of operation of DAS the DAS of FIGS. 1 and 2 according to an embodiment of the invention.

Operation of DAS 32 is illustrated in flowchart 300 of FIG. 4 and with respect to DAS 32 as illustrated in FIG. 3. After starting at step 302, a baseline signal is sampled at 304 via, for instance, baseline sampling circuit 218 and discriminator 202. After sampling the baseline signal at 304, the next event or charge $Q_{in}$ received in the detector after a slight delay is received in CSA 200 at step 306. Charge $Q_{in}$ is converted to a voltage in CSA 200 at step 308, and the voltage is shaped at step 310. At step 312, discriminator 202 establishes a signal strength of $Q_{in}$ based on both the shaped voltage and the sampled baseline. If $V_{th}$ is exceeded at step 314, then counter register 204 is incremented at 316, and control passes back to start at step 302. If $V_{th}$ is not exceeded at step 314, then control passes back to start at step 302 without incrementing counter register 204.

Referring still to FIG. 3, controller 224 may further control DAS 32 to adaptively sample data for baseline calibration according to embodiments of the invention. According to one embodiment, a unit timer algorithm is implemented by controller 224 after an event is processed by CSA 200 or discriminator 202. In this embodiment, the baseline is allowed to settle for a fixed period or delay after each event that is based on a targeted maximum count rate. As one example, for a targeted count rate of 10 mega-counts per second (MCPS), the delay may be set to 80 nanoseconds. One skilled in the art will recognize that the time delay of 80 nanoseconds is but an example and that skilled artisans may select a different fixed delay based on different applications and conditions for data acquisition. By fixing the time delay, the baseline is ensured to be settled such that a stable reading may thus obtained. Using 80 nanoseconds as the example, controller 224 is programmed to implement an 80 nanosecond unit timer algorithm and cause the baseline to be calibrated as described above 80 nanoseconds after the event is received/processed by CSA 200. However, because the time delay is fixed, incoming data during the fixed time delay is lost, resulting in lost data or "dead time." Thus, although the unit timer offers a solution to baseline wander, it may result in lost data for increased rates of flux. In other words, the unit timer is useful and effective for low flux conditions, however as the flux increases there may be lost data due to a delay in data acquisition to obtain a stable baseline.

According to another embodiment, an average count-rate-dependent delay is implemented by controller 224 that adaptively monitors and samples a baseline that is based on data rate. According to this embodiment, the baseline during event sampling by DAS 32 at a first flux or data rate is determined. Data may first be sampled at a first flux or data rate using DAS 32, and a first baseline may be obtained therefrom during the event sampling. The first baseline is thus obtained for a given flux, and this baseline may be used for subsequent imaging data when this given flux. Subsequently, when imaging data is being obtained at the first flux rate, the first baseline is applied and sampling of the baseline during data acquisition is unnecessary. In such fashion, it is possible to predict a baseline which may be later applied when a corresponding flux level at first flux rate is experienced.

Further, because the baseline is a function of data rate, it is possible to obtain multiple baselines for correspondingly different data rates or fluxes. Thus, the multiple baselines may be selectively applied by controller 224 during data acquisition, the baseline selected according to the incoming data rate and based predictively on previously obtained baseline data. This embodiment reduces or eliminates dead time that may result from a fixed time delay as discussed above, but at the expense of having to dedicate periods of data acquisition to determination of the baseline. Thus, a data acquisition scheme based on an average count rate may be applicable for conditions of increased or higher flux.

The average count rate may be determined in a number of ways. In one embodiment, the number of events N in a given time window T are counted. The length of the time window T is programmable and may be set by a user. Then, the quantity N/T yields an average for that given flux rate. As one example, for a time window T of 1 microsecond, if 8 counts are measured during time window T, then the average count rate is 8 MCPS. Thus, for a typical unit time delay of 80 nanoseconds, using the maximum 10 MCPS as for the fixed time delay as discussed above, and using the 8 MCPS data rate and including some margin (10 nanoseconds in this example), the time delay in this example may be (10 MCPS/8 MCPS)×80 nanoseconds−10 nanoseconds=90 ns. In another embodiment, the average count rate is determined by measuring the time that has lapsed for a series of N events.

Figure 5:
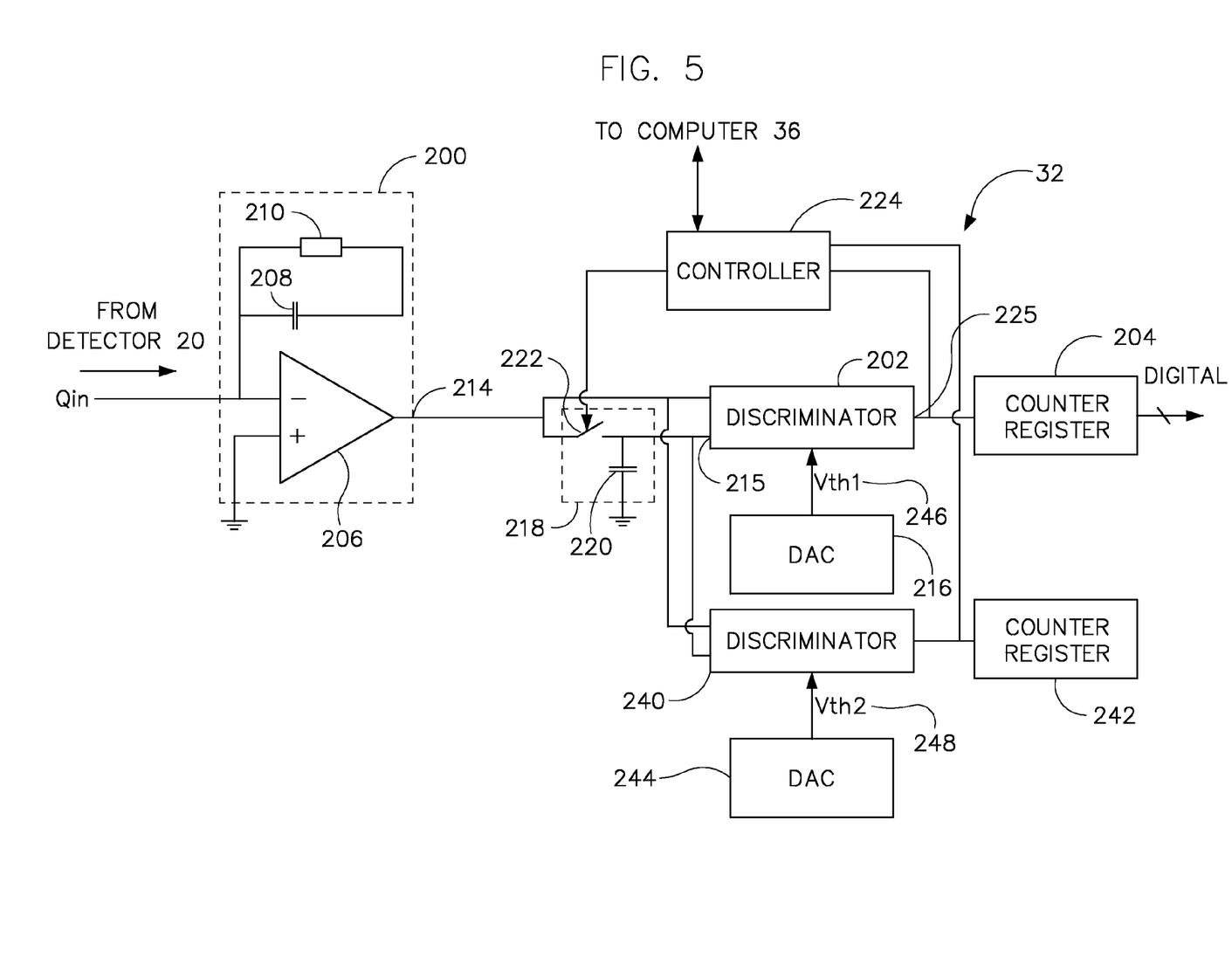
FIG. 5 is a block diagram of a channel of DAS 32 of FIGS. 1 and 2 having a controller with a baseline reset, according to an embodiment of the invention.

FIG. 5 illustrates a channel of DAS 32 according to another embodiment of the invention. This embodiment includes CSA 200, discriminator 202, counter register 204, DAC 216, and baseline sampling circuit 218. However, in this embodiment, because the pulse shaper 212 of FIG. 3 is typically included for the purpose of noise reduction, it is removed as a separate circuit in DAS 32 for the higher count rate applications in which embodiments of this invention may be used such as in a CT application. Thus, contrary to that illustrated in FIG. 3, the pulse shaper 212 has been removed from the circuit shown in FIG. 5, and its functionality is built into high-gain voltage amplifier 206 of CSA 200 as understood in the art. As such, one skilled in the art will recognize that opamp 206 can act as both an integrator and a shaper, resulting in a significant reduction in die area and overall power requirements for DAS 32.

Further, although only a single discriminator 202 and counter register 204 are illustrated in FIG. 3, one skilled in the art will recognize that multiple discriminators and counter registers may be used to provide a coarse energy discrimination capability for each channel of DAS 32. For instance, FIG. 5 illustrates multiple discriminators, including discriminator 202 and counter register 204 as illustrated in FIGS. 3 and 5.

However, in this embodiment, DAS 32 also includes a second discriminator 240 coupled to a second counter register 242, and second discriminator 240 is configured to also received output from CSA 200. DAS 32 also includes a second DAC 244 configured to output a threshold voltage to second discriminator 240, which is coupled to a second counter register 242. Thus, DAC 216 is configured to output a first threshold voltage $V_{th1}$ 246 to discriminator 202, and DAC 244 is configured to output a second threshold voltage $V_{th2}$ 248 to second discriminator 240. Thus, selectively setting the threshold voltages $V_{th1}$ 246 and $V_{th2}$ 248 enables, in addition to photon counting capability, an ability to coarsely determine energy content based on the threshold voltages selected. For example, the energy content received may be binned in either first counter register 204 or second counter register 242 based on threshold voltages $V_{th1}$ 246 and $V_{th2}$ 248. This binning allows a coarse determination of the energy content received based on the bin counts. Further, one skilled in the art will recognize that more discriminator/counter circuits may be included to provide yet additional resolution to the energy content of detector signal $Q_{in}$. Additionally, although multiple discriminators 202, 240 are illustrated with respect to FIG. 5, one skilled in the art will recognize that multiple discriminators may be implemented in all embodiments disclosed herein to provide ability to determine a coarse energy content of detector signal $Q_{in}$.

Figure 6:
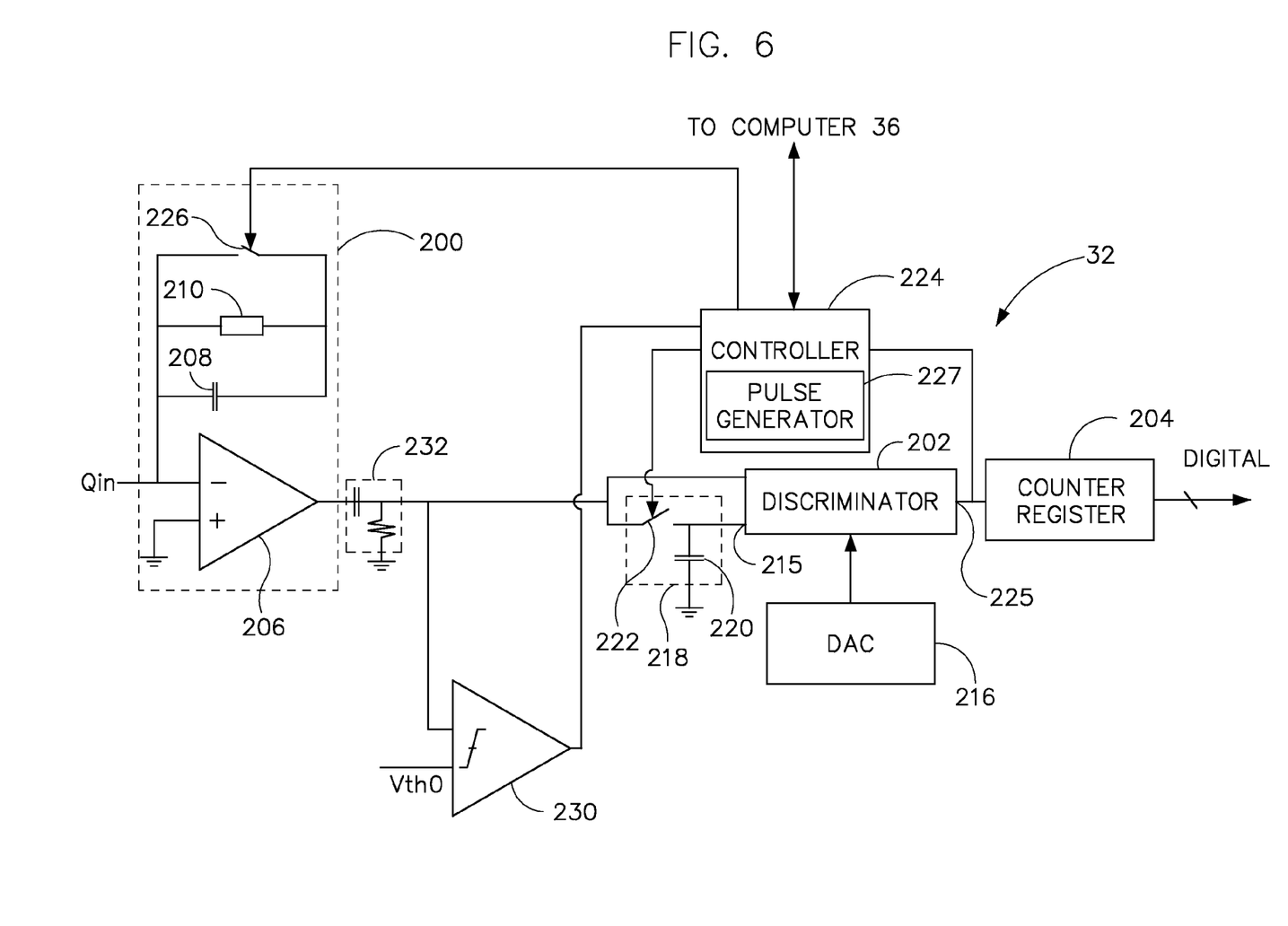
FIG. 6 is a block diagram of a channel of DAS 32 of FIGS. 1 and 2 having a controller with a CSA reset, according to an embodiment of the invention.

FIG. 6 illustrates additional control schemes for reset of CSA 200 in a channel of DAS 32, according to embodiments of the invention. This embodiment includes CSA 200, discriminator 202, counter 204, DAC 216, baseline sampling circuit 218, and controller 224 as described above. However, in this embodiment, controller 224 is further coupled to CSA 200 to selectively control a low-impedance switch 226 within CSA 200 and in parallel with elements 206, 208, and 210 thereof.

In the previous embodiments illustrated in FIGS. 3 and 5, resistor 210 is illustrated as being mounted in parallel with opamp 206 and capacitor 208 of CSA 200. Such a configuration results in a continuous reset of CSA 200 and is equivalent to the circuit illustrated in FIG. 5, with switch 226 in the open position. CSA 200 is reset in order to avoid saturation of opamp 206. At high count rates, a low resistance is typically used to obtain a quicker reset. However, a low resistance of resistor 210 also results in decreased energy resolution due in part to the known phenomenon of ballistic deficit. Ballistic deficit results because resistor 210 continuously discharges capacitor 208, even during periods when signal charge is generated from detector 20. The effect is variable and is a function of data rate, such as the time duration of different charge pulses created in detector 20.

Thus, switch 226 of CSA 200 may be used to periodically reset CSA 200 according to embodiments of the invention by operating in a pulsed reset mode. According to this embodiment, a pulse generator 227 may be programmed into controller 224 that is used to establish a periodicity used to reset CSA 200. Thus, controller 224 may establish and control the periodicity via the pulse generator 227, which in turn can be used to establish a rate of reset of CSA 200. Such a control scheme thus periodically resets CSA 200 while avoiding ballistic deficit, and such operation is faster than the continuous reset approach described above.

Additionally, because a high incidence rate of photons typically only uses a small dynamic range of CSA 200, it is possible to delay reset of CSA 200 after several events instead of after each event. Accordingly, controller 224 may be configured to monitor incoming data and reset CSA 200 after a plurality of pulses but prior to saturation of opamp 206 of CSA 200 according to another embodiment. Thus, according to this embodiment, a coarse discriminator 230 may be used in conjunction with controller 224 to prevent CSA 200 from saturating and to monitor an accumulated pulse voltage to determine, via controller 224, when to reset CSA 200.

However, in a pulsed reset operation alone, leakage current may still be large because, between the periodic resets, leakage current may continue to build charge in capacitor 210. Thus, according to an embodiment of the invention, a pulse-assisted continuous reset scheme may be implemented. According to this embodiment, switch 226 is controlled to be open between periodic pulses, thus causing a continuous reset and avoiding the building charge in capacitor 208 from leakage current. However, after detecting one or more events but before saturation of CSA 200, controller 224 may then command a pulsed reset to occur as discussed above. Thus, a continuous reset may be used in conjunction with a pulsed reset to minimize the effects of leakage current while periodically implementing a pulsed reset to reset CSA 200 faster thus reduce the system dead time. Further, because controller 224 is configured to periodically apply a reset pulse, controller 224 can also favorably time the baseline reset pulses as well by causing the baseline to be sampled, via control of switch 222 as discussed, in conjunction with the timing of control of the pulsed reset of CSA 200.

In addition, because of the high-frequency operation of, for instance, a CT operation with DAS 32, FIG. 6 illustrates an embodiment of the pulse shaping functionality that may be used in any of the embodiments illustrated herein in lieu of other shaping circuits or functionality described above. Thus, according to embodiments of the invention, a pulse shaping RC circuit or high-pass filter 232 may be included between opamp 206 and discriminator 202. RC circuit 232 provides pulse shaping functionality while using little circuit space and little cost.

Figure 7:
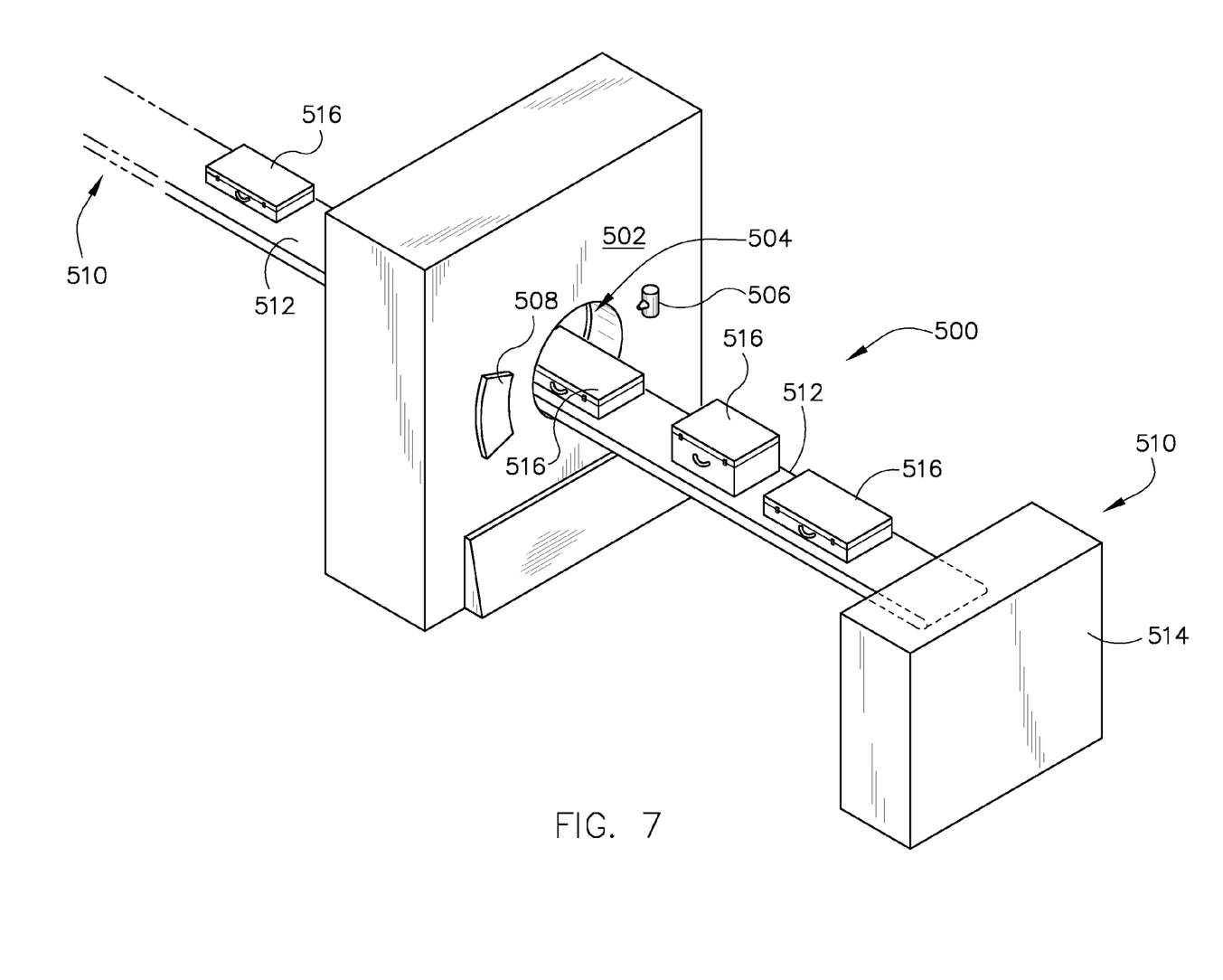
FIG. 7 is a pictorial view of a CT system for use with a non-invasive package inspection system.

Referring now to FIG. 7, package/baggage inspection system 500, incorporating embodiments of the invention, includes a rotatable gantry 502 having an opening 504 therein through which packages or pieces of baggage may pass. The rotatable gantry 502 houses a high-frequency electromagnetic energy source 506 as well as a detector assembly 508 semiconductor radiation detector elements, such as CZT detector elements similar to that shown in FIG. 6 or 7. A conveyor system 510 is also provided and includes a conveyor belt 512 supported by structure 514 to automatically and continuously pass packages or baggage pieces 516 through opening 504 to be scanned. Objects 516 are fed through opening 504 by conveyor belt 512, imaging data is then acquired, and the conveyor belt 512 removes the packages 516 from opening 504 in a controlled and continuous manner. As a result, postal inspectors, baggage handlers, and other security personnel may non-invasively inspect the contents of packages 516 for explosives, knives, guns, contraband, etc.

According to one embodiment of the invention, a data acquisition system includes a charge-sensitive amplifier (CSA) configured to receive a charge from an x-ray detector, the CSA includes a high-gain electronic voltage amplifier, an electrical energy storage device coupled in parallel with the high-gain electronic voltage amplifier, and an electrical resistor coupled in parallel with the high-gain electronic voltage amplifier. The data acquisition system includes a baseline sampling circuit configured to receive an output from the CSA and configured to sample a baseline signal from the CSA, at least one discriminator coupled to an output of the CSA and to an output of the baseline sampling circuit, the at least one discriminator configured to output a voltage if the output of the CSA exceeds a threshold voltage, and a counter coupled to an output of the discriminator and configured to output a digital signal indicative of a photon count received at the x-ray detector and based on the output from the CSA and based on the baseline signal from the CSA.

In accordance with another embodiment of the invention, a method of acquiring x-ray imaging data includes sampling a baseline signal in an imaging detection circuit prior to receiving an output from an x-ray detector, receiving the output from the x-ray detector in a high-gain amplifier, the output indicative of a charge received in an x-ray detector, and amplifying the output in the high-gain amplifier to generate an amplified output. The method further includes generating a shaped pulse of the amplified output, and generating a digital signal based on the shaped pulse and the baseline signal.

Yet another embodiment of the invention includes a radiation detection system that includes a semiconductor radiation detector configured to output an electrical signal when a first pulse of radiation is detected, an application-specific integrated circuits (ASIC) configured to receive and amplify the output from the radiation detector, a baseline sampling circuit configured to sample a baseline electrical signal from the ASIC prior to detecting the first pulse of radiation, and a digital output device configured to output a digital signal that is a function of at least the electrical signal and the sampled baseline.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A data acquisition system comprising:
    a charge-sensitive amplifier (CSA) configured to receive a charge from an x-ray detector, the CSA comprising:
        a high-gain electronic voltage amplifier;
        an electrical energy storage device coupled in parallel with the high-gain electronic voltage amplifier; and
        an electrical resistor coupled in parallel with the high-gain electronic voltage amplifier;
    a baseline sampling circuit configured to receive an output from the CSA and configured to sample a baseline signal from the CSA to compensate for baseline wander;
    at least one discriminator coupled to an output of the CSA and to an output of the baseline sampling circuit, the at least one discriminator configured to output a voltage if the output of the CSA exceeds a threshold voltage;
    a counter coupled to an output of the discriminator and configured to output a digital signal indicative of a photon count received at the x-ray detector and based on the output from the CSA and based on the baseline signal from the CSA; and
    a controller configured to monitor the output of the at least one discriminator and control a sampling rate of the baseline signal.

2. The data acquisition system of claim 1 wherein the baseline sampling circuit is further configured to sample the baseline signal prior to receiving output from the CSA.

3. The data acquisition system of claim 1 comprising a shaper circuit input coupled to an output of the high-gain electronic voltage amplifier, the shaper circuit configured to output a shaped voltage pulse to the discriminator.

4. The data acquisition system of claim 3 wherein the shaper circuit comprises a high-pass filter.

5. The data acquisition system of claim 1 wherein the electrical energy storage device is a capacitor.

6. The data acquisition system of claim 1, wherein the controller is configured to:
    selectively connect the output of the CSA to the input of the baseline sampling circuit; and
    command the baseline sampling circuit to sample the baseline signal.

7. The data acquisition system of claim 6 wherein the CSA comprises a switch connected in parallel with the high-gain electronic voltage amplifier, the switch coupled to the controller and wherein the controller is configured to selectively close the switch to discharge the electrical energy storage device.

8. The data acquisition system of claim 7 further comprising a coarse discriminator coupled to an output of the CSA, wherein the controller is configured to adaptively reset the high-gain electronic voltage amplifier, based on an output of the coarse discriminator, by closing the switch after a plurality of pulses and prior to saturation of the high-gain electronic voltage amplifier.

9. The data acquisition system of claim 6 wherein the controller is configured to command the baseline sampling circuit to adaptively sample the baseline signal after a fixed time delay.

10. The data acquisition system of claim 6 wherein:
    the controller is configured to adaptively sample the baseline signal by calculating an average rate-dependent baseline from the baseline sampling circuit based on a plurality of sampled baseline signals; and
    the counter is configured to output the digital signal using the average rate-dependent baseline.

11. The data acquisition system of claim 1 wherein the high-gain electronic voltage amplifier is an operational amplifier.

12. A method of acquiring x-ray imaging data comprising:
    sampling a baseline signal in an imaging detection circuit prior to receiving an output from an x-ray detector;
    receiving the output from the x-ray detector in a high-gain amplifier, the output indicative of a charge received in the x-ray detector;
    amplifying the output in the high-gain amplifier to generate an amplified output;
    generating a shaped pulse of the amplified output;
    generating a digital signal based on the shaped pulse and the baseline signal; and
    controlling a sampling rate of the baseline signal based on the digital signal.

13. The method of claim 12 wherein the digital signal is indicative of an amount of energy in the charge.

14. The method of claim 12 wherein sampling the baseline signal comprises sampling the baseline signal after a previous pulse and after a fixed time delay.

15. The method of claim 12 comprising calculating an average rate-dependent baseline using a plurality of sampled baseline signals and generating the digital signal based on the average rate-dependent baseline.

16. The method of claim 12 comprising continuously discharging the high-gain voltage amplifier through a resistive element connected in parallel therewith.

17. The method of claim 12 comprising periodically resetting the high-gain voltage amplifier by shorting an input to the high-gain voltage amplifier to its input node.

18. The method of claim 17 comprising continuously discharging the high-gain voltage amplifier through a resistive element connected in parallel therewith.

19. The method of claim 17 comprising resetting the high-gain voltage amplifier after a plurality of charges are received in the x-ray detector and prior to saturation of the high-gain voltage amplifier.

20. A radiation detection system comprising:
- a semiconductor radiation detector configured to output an electrical signal when a first pulse of radiation is detected;
- an application-specific integrated circuits (ASIC) configured to receive and amplify the output from the radiation detector;
- a baseline sampling circuit configured to sample a baseline electrical signal from the ASIC prior to detecting the first pulse of radiation;
- a digital output device configured to output a digital signal that is a function of at least the electrical signal and the sampled baseline electrical signal; and
- a controller configured to control a sampling rate of the baseline electrical signal based on the digital signal.

21. The radiation detection system of claim 20 wherein the electrical signal is proportional to an amount of energy in the first pulse of radiation.

22. The radiation detection system of claim 20 comprising a controller configured to implement one of:
- delay for a fixed time period after a previous pulse before sampling the baseline electrical signal and before the first pulse of radiation; and
- calculate a rate-dependent baseline using a plurality of sampled baselines, wherein the digital signal output is a function of the calculated rate-dependent baseline.

23. The radiation detection system of claim 20 wherein the ASIC comprises a capacitor configured to collect the electrical signal, and a resistor configured to continuously reset a charge in the capacitor.

24. The radiation detection system of claim 23 comprising a controller configured to selectively ground an input to the capacitor after a plurality of pulses of radiation are detected by the semiconductor radiation detector and before the ASIC saturates.

* * * * *